United States Patent [19]

Michimae et al.

[11] Patent Number: 4,726,819

[45] Date of Patent: Feb. 23, 1988

[54] PROCESS AND APPARATUS FOR RECOVERING OIL COMPONENT FROM DRY-DISTILLED GAS FLOW OR SOLID POLYMER WASTES

[75] Inventors: Kiyoharu Michimae; Akira Amamiya, both of Takaoka, Japan; Hiroshi Akimoto, Fort Lee, N.J.

[73] Assignees: The Brook Club, Inc., Mass.; Michimae C.K.K. Kaisha, Toyama, Japan

[21] Appl. No.: 877,325

[22] Filed: Jun. 23, 1986

[30] Foreign Application Priority Data

Jun. 25, 1985 [JP]  Japan .................................. 60-137050
Jun. 25, 1985 [JP]  Japan .................................. 60-137051

[51] Int. Cl.$^4$ ............................................. B01D 3/42
[52] U.S. Cl. ........................................... 55/20; 55/80;
  55/269; 165/95; 202/197; 203/40
[58] Field of Search .............. 55/20, 80, 217, 268,
  55/269; 165/95, 111; 202/186, 197; 203/40, 78

[56] References Cited

U.S. PATENT DOCUMENTS

| | | | |
|---|---|---|---|
| 3,570,589 | 3/1971 | Biesinger | 165/111 X |
| 3,618,301 | 11/1971 | Handman | 55/89 |
| 3,693,707 | 9/1972 | Richter | 165/111 X |
| 4,078,390 | 3/1978 | Duvall | 55/20 X |
| 4,372,759 | 2/1983 | Sederguist et al. | 165/111 X |
| 4,452,154 | 6/1984 | Kono et al. | 110/344 |
| 4,544,380 | 10/1985 | Itou et al. | 55/80 |

FOREIGN PATENT DOCUMENTS

58-179799A  10/1983  Japan .

*Primary Examiner*—Charles Hart
*Attorney, Agent, or Firm*—Lee C. Robinson, Jr.

[57] ABSTRACT

The present invention relates generally to a process and apparatus for recovering the oil component from a flow of dust-including dry-distilled gases produced in a furnace for thermal-decomposing solid polymer wastes, and more particularly to a process and apparatus for continuously recovering the oil component from a flow of dry-distilled gases comprising combustive gases, an oil component, moisture, and dust which are produced in a furnace for thermal-decomposing or dry-distilling polymer wastes such as waste rubber tires, waste plastics, etc.

11 Claims, 3 Drawing Figures

PROCESS AND APPARATUS FOR RECOVERING OIL COMPONENT FROM DRY-DISTILLED GAS FLOW OR SOLID POLYMER WASTES

BACKGROUND OF THE INVENTION

With the recent remarkable increase in the amount of generation of waste plastics, rubber tires, etc. resulting from the development of industry, the regeneration and appropriate treatment of these wastes become more and more a great social problem, from the viewpoints of resource-saving, energy-saving and the protection of environment.

The dry-distilled gases produced in a process for dry distillation of solid wastes such as waste rubber tires include a relatively large amount of dust. This dust is combined with the oil component produced through the dry distillation process to form a highly viscous mixture. This highly viscous mixture brings about such serious problems as: (1) it adheres to the gas passageways having a relatively low temperature, the complicated and labyrinthine portions, and the bottom portion of the apparatus, resulting in remarkably lowering the recovering efficiency of the oil component from a flow of dry-distilled gases; (2) the passageways of the apparatus are closed by the dust adhered and accumulated thereon, and in certain cases it is required to stop the operation of the apparatus and to disassemble it for cleaning; and the like.

DESCRIPTION OF THE PRIOR ART

For example, Japanese Laid-Open patent application Publication No. 179799/83 (H. Asao et al) discloses an apparatus for recovering the oil component from a flow of dry-distilled gases of waste rubber tires. This invention relates to a heat exchanger for recovering combustive components by cooling the dry-distilled gases generated in a distillation process of combustibles contained therein. It is characterized by comprising (a) providing a vertically slidable cleaning means to clean the inner wall surface of a body of the heat exchanger; (b) having a stirring means to stabilize the oil condensed from the dry-distilled gases and the accumulated dust mounted on the upper portion of an outlet thereof; and (c) having a scraping means to collect the dust-rich heavy oil sedimented and accumulated on the bottom thereof into the vicinity of the outlet. It is considered that this prior invention is superior to the conventional apparatus with respect to a means for removing the dust adhered to and accumulated within the heat exchanger.

However, this prior invention is insufficient in the respects such as the efficiencies in the separation and recovery of the oil component and dust from the dry-distilled gases, the facility of removal of adhered dust, and the simplicity in the structure of the apparatus.

The oil recovering apparatus described above according to the prior art, for example, the apparatus disclosed in said Japanese Laid-Open patent appln. Publn. No. 179799/83, has the disadvantages that the efficiencies in the separation and recovery of the oil component and dust from the dry-distilled gases are considerably low; the dust included in the gases tends to firmly adhere to the surface of baffles or cooling pipes, and thus removal of the adhered dust is difficult due to the undesirable temperature control of the baffle and cooling pipes. Furthermore, because the body of the heat exchanger is integral with its bottom portion, it is difficult to remove the sludge comprising dust adhered to and accumulated on the inner surface of the bottom, and thus, in certain cases, operators must stop the operation of the apparatus and disassemble it for cleaning. In addition, because the cooling pipe cleaning means is rigid, the removal of the high viscous dust firmly adhered to the surface of the cooling pipes is incomplete and thus, recovery efficiency of the oil component is considerably low, and in certain cases operators must stop operation of the apparatus and disassemble it for cleaning.

It is therefore an object of the present invention to provide an apparatus for recovering the oil component from a flow of dry-distilled gases of solid polymer wastes which is capable of surely and easily removing the dust adhered to and accumulated on the interior of the apparatus, allowing a long-term continuous run of the apparatus.

Another object of the present invention is to provide an apparatus which is capable of providing a high efficiency of separation and recovery of the dust from the dry-distilled gas flow, and easily removing the dust adhered to the surfaces of the baffle and/or cooling pipes.

Yet another object of the present invention is to provide said apparatus having a flexible means for cleaning the cooling pipes.

Still yet another object of the present invention is to provide a process for recovering the oil component from the dry-distilled gases of solid polymer wastes, which is capable of providing a high efficiency of separation and recovery of dust from the dry-distilled gases, easily removing the dust adhered to the baffle and/or cooling pipes, and controlling the condensation of the oil component onto the surfaces of the baffle and/or cooling pipes.

These and other objects, features and advantages of the present invention may be more clearly understood and appreciated from a view of the following detailed description of the disclosed embodiments and by reference to the appended drawings and claims.

SUMMARY OF THE INVENTION

In one embodiment, the present invention comprises a main housing and a bottom housing separated from the main housing and having a sealing construction of the space therebetween with a liquid.

In another embodiment, the present invention comprises a main housing, a bottom housing separated from the main housing, a baffle having a temperature control means for maintaining the surface temperature of the baffle at a predetermined level, plural groups of cooling pipes maintained at a predetermined temperature for condensing the oil component, a flexible cooling pipe cleaning means to remove the dust adhered to the surface of the cooling pipes by vertically sliding on the surface of each of the cooling pipes, and a means for preventing the short-circuiting of the dry-distilled gases provided on the lower end of each group of the cooling pipes.

In another embodiment, the process of the present invention comprises steps of introducing a flow of the dust-including dry-distilled gases maintained at a predetermined range of temperatures into an oil component recovering apparatus comprising a main housing, a bottom housing separated from the main housing and filled with a liquid to seal the space therebetween, a baffle disposed within the main housing and having a temperature control means for maintaining the surface temperature of the baffle at a predetermined level, a series of cooling pipe groups disposed spaced apart from each other downstream from the baffle and having a temperature control means for maintaining the surface temperature of each of the cooling pipes at a predetermined level, a flexible cooling pipe cleaning means for removing the tacky dust adhered to the peripheries of each group of cooling pipes by permitting it to vertically slide around the surfaces of the cooling pipes, and a sludge removal means for operatively removing the sludge settled on the inner surface of the bottom housing; permitting the introduced dry distilled gas flow to come in contact with the surface of the baffle to remove most of the dust from the dry-distilled gases; passing the resulting dry-distilled gas flow through the surroundings of the series of the cooling pipe groups to completely remove the dust remaining in the gas flow as well as to condense the minimum amount of oil contained in the gas flow; transporting the flow of mixed gases of the dust-removed, residual oil component and combustible gases through an outlet of the apparatus to another oil component recovering apparatus and/or other apparatus; and regularly removing the dust and sludge settled within the bottom housing by the sludge removing means.

In the apparatus of the present invention, the bottom housing is separated from the main housing and the space therebetween is sealed with a liquid, so that the dust and sludge adhered to and/or accumulated inside the apparatus can easily be removed and thus, troubles such as clogging of the passageways for the dry-distilled gases with dust, and the like can be solved.

The apparatus of the present invention has a temperature control means for maintaining the temperature of the baffle and cooling pipes at the desired level, so that a high efficiency of the separation and recovery of the oil component and dust from dry-distilled gases can be obtained, adhesion of dust to the surfaces of the baffle and cooling pipes can be reduced, and easy removal of the adhered dust can be obtained.

Furthermore, the apparatus of the present invention has a flexible cooling pipe cleaning means, so that even if dust adheres to the surfaces of each group of cooling pipes, the dust can surely and easily be removed and thus, clogging of the gas passageways among the cooling pipes can be prevented.

BRIEF DESCRIPTION OF THE DRAWINGS

FIG. 2 is a partly enlarged view of the cooling pipe cleaning device mounted on a group of cooling pipes.

DETAILED DESCRIPTION OF THE PREFERRED EMBODIMENTS OF THE INVENTION

Figure 1:
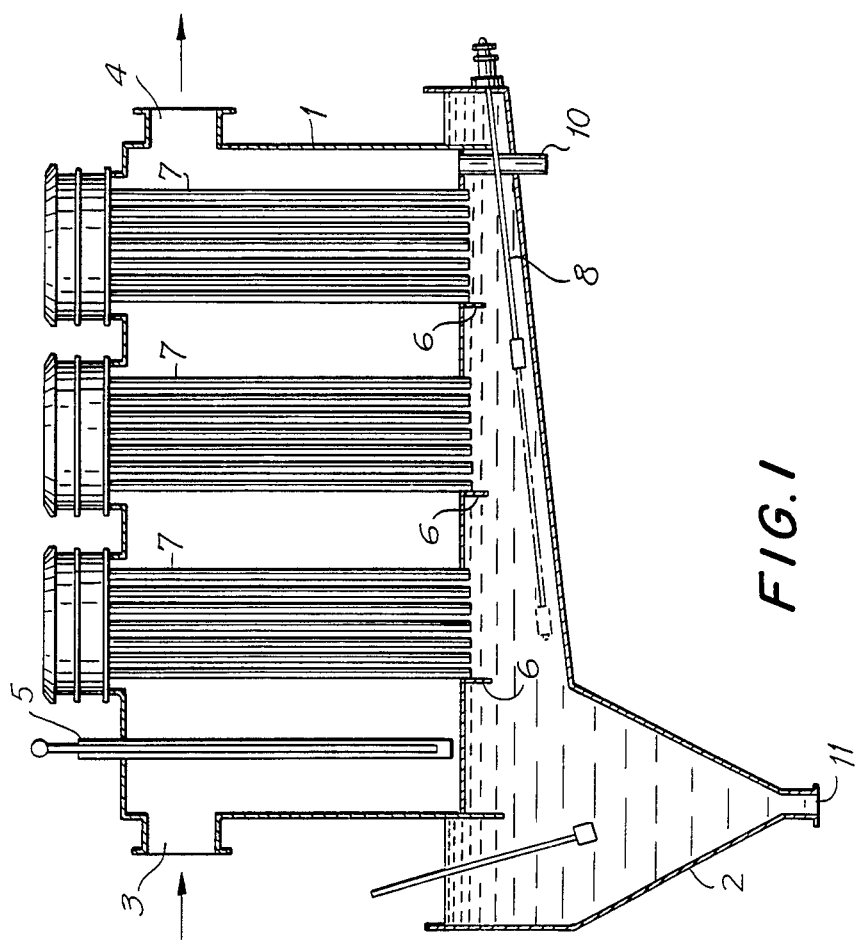
FIG. 1 is a schematic side view of a preferred embodiment of apparatus for recovering the oil component from the flow of dry-distilled gases of solid polymer wastes according to the present invention.

Referring to the drawings, in which like numerals indicate like elements throughout the several views, FIG. 1 shows a schematic side view of an apparatus for recovering the oil component from a flow of dry-distilled gases of solid polymer wastes such as waste rubber tires.

The apparatus according to the present invention comprises an upper main housing 1 of the apparatus body and a bottom housing 2 arranged downwardly spaced from the main housing 1. When operation of the apparatus is started, the space between the bottom housing 2 and the upper main housing 1 is filled with a liquid such as water or waste oil, but this liquid is gradually replaced by the oil 12 condensed from the dry-distilled gases. In one of the preferred embodiments according to the process of the present invention, the level of the condensed oil within the housing 1 is lower than that of the oil outside the housing 1 as shown in FIG. 1 when the pressure inside the housing 1 is maintained at a pressure a little higher than atmospheric pressure.

The main housing 1 has an inlet 3 for the flow of dry-distilled gases which is connected to a furnace for pyrolyzing waste polymer (not shown) through a cyclone, etc. (not shown), and an outlet 4 for the flow of dry-distilled gases from which a part of the oil components and dust have been removed.

A baffle 5 is disposed downstream from the inlet 3 at a predetermined interval and perpendicularly to the flow of the dry-distilled gases introduced. The introduced dry-distilled gases make contact with the surface of this baffle 5, to permit the dust contained in the dry-distilled gases to fall downward. The baffle 5 is provided with a temperature control means to maintain its surface temperature at a desired level by passing a fluid, for example, water kept at a predetermined temperature, through the interior thereof. For example, in the case where the gas flow introduced from the inlet 3 has a temperature ranging from about 100° to about 500° C. and a flow rate from about 1 to about 30 m/sec, the surface temperature of the baffle 5 can be maintained at a desired level corresponding to a kind of oil to be recovered by passing a flow of the liquid such as water kept at a temperature of 5°-50° C. or 30°-80° C. through the interior of the baffle 5. In general, it is preferred that the liquid has a relatively higher temperature for light oil and a relatively lower temperature for heavy oil.

A series of cooling pipe groups 7 (FIG. 1 shows three groups of cooling pipes) spaced apart from each other is vertically hung downstream from the baffle 5. Each group of cooling pipes 7 comprises a number of double type cooling pipes disposed at predetermined intervals from the bottom housing 2, and has a short-circuit preventive plate 6 for the dry-distilled gas flow on the rear lower end thereof. The temperature of the liquid passed through these cooling pipes 7 can be controlled to an appropriate temperature, for example, 0°-100° C. according to the properties of oil contained in dry-distilled gases. Contrary to the case of the baffle 5, it is preferred to select a relatively low temperature for light oil and a relatively high temperature for heavy oil. By selecting a suitable surface temperature of the cooling pipe groups in this way, it is possible to provide the most preferable condensation rate of oils for preventing the clogging of interspaces or passageways among the cooling pipes and for providing a high recovery of dust.

The bottom housing 2 has a scraper 8 mounted on the bottom thereof to scrape the dust and sludge accumulated on the bottom surface and to collect them into an outlet 11. The dust and sludge adhered on the inner surface of a side wall of the bottom housing 2 can be removed by a hand-operated removing device 9. An overflow pipe 10 is mounted on a bottom wall of the bottom housing 2. Of course, a plurality of overflow pipes 10 having different heights respectively can be mounted instead of the single one. The sludge accumulated in the lower portion of the bottom housing 2 is removed through a sludge-outlet 11.

Figure 2A:
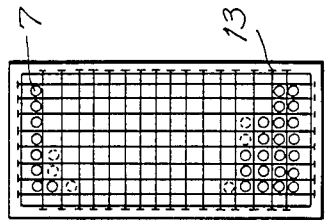
FIG. 2A is its horizontal sectional view.
Figure 2B:
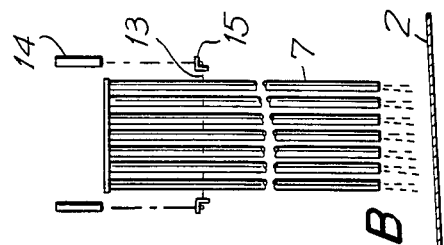
FIG. 2B is its side view.

Referring to FIG. 2 showing partly enlarged views of a means for cleaning each group of cooling pipes 7, FIG. 2A is its horizontal sectional view and FIG. 2B is its side view. This cooling pipe cleaning means 15 comprises a metal wire net vertically slidably mounted around the peripheries of the cooling pipes 7 and a means 14 for vertically moving the wire net 13.

In the apparatus of the present invention, the dust adhered to and accumulated on the interior of the apparatus can easily and surely be removed, resulting in a long-term continuous run thereof, because the bottom housing is not integral with the main housing. This apparatus can provide a high efficiency of separation and recovery of dust from the flow of dry-distilled gases and a highly efficient removal of dust adhered to the surfaces of the baffle and/or cooling pipes because it has a temperature control means for maintaining their surface temperatures at a desired level.

Furthermore, this apparatus can surely and easily remove the dust adhered onto the surfaces of each group of cooling pipes because it has a flexible cooling pipe cleaning means.

What is claimed is:

1. An apparatus for separating and recovering the oil components from a flow of dust-including dry-distilled gases produced in a furnace for pyrolyzing solid polymer wastes, comprising a main housing, a bottom housing separated from the main housing and including a liquid-sealing structure for sealing the space between the bottom housing and the main housing, a baffle disposed within the main housing in a position along the flow of the dry-distilled gases and having a temperature control means for maintaining the surface temperature of the baffle at a predetermined level by passing a fluid kept at a predetermined temperature through the interior of the baffle to aid in removing dust from the dry-distilled gases, and plural groups of rigid cooling pipes disposed within the main housing downstream of the baffle, each group of cooling pipes includes an associated cooling pipe cleaning means.

2. The apparatus as set forth in claim 1 wherein each said cooling pipe cleaning means includes a metal wire net vertically slidably mounted around and conforming to each group of cooling pipes to remove dust adhered to each cooling pipe.

3. The apparatus as set forth in claim 2 wherein said surface temperature of the baffle is maintained at the range of from 5° to 50° C., or from 30° to 80° C. by said temperature control means.

4. The apparatus as set forth in claim 1 wherein each of said plural groups of cooling pipes has a temperature control means for maintaining the surface temperature of the cooling pipes at a predetermined level.

5. The apparatus as set forth in claim 1 wherein each of said plural groups of cooling pipes has a means for preventing the short-circuiting of the flow of the dry-distilled gases provided on the lower end thereof.

6. The apparatus as set forth in claim 1 wherein each cooling pipe cleaning means removes the dust adhered to the surface of the cooling pipes by vertically sliding on the surface thereof.

7. A process for recovering the oil component from a flow of dust-including dry-distilled gases produced in a furnace for pyrolyzing solid polymer wastes, comprising steps of:

introducing said flow of dust-including dry-distilled gases maintained at a predetermined range of temperatures into an oil component recovering apparatus comprising a main housing, a bottom housing separated from the main housing and filled with a liquid to seal the space therebetween, a baffle disposed within the main housing and having a temperature control means for maintaining the surface temperature of the baffle at a predetermined level by passing a fluid kept at a predetermined temperature through the interior of the baffle to aid in removing dust from the dry-distilled gases, a series of rigid cooling pipe groups disposed spaced apart from each other downstream from the baffle and having a temperature control means for maintaining the surface temperature of each of the cooling pipes at a predetermined level, a flexible cooling pipe cleaning means for removing the dust adhered to the peripheries of each group of cooling pipes by permitting said means to vertically slide around the surfaces of the cooling pipes, and a sludge removal means for operatively removing the sludge settled on the inner surface of said bottom housing;

permitting said flow of the introduced dry-distilled gases to make contact with the surface of the baffle to remove most of the dust from said dry-distilled gases;

passing the resulting dry-distilled gas flow through the surroundings of said cooling pipe groups to completely remove the remaining dust contained in said gas flow and to condense the minimum amount of oil contained in said gas flow;

transporting the flow of mixed gases of the dust-removing oil component and combustible gases through an outlet of said apparatus to another apparatus; and regularly removing the dust and sludge settled within said bottom housing by said sludge removal means.

8. The process as set forth in claim 7 wherein the temperature of said flow of dust-including dry-distilled gases introduced into said apparatus is a temperature ranging from about 100° to about 5000° C.

9. The process as set forth in claim 7 wherein the surface temperature of the baffle is maintained at a level ranging from about 0° to 50° C. or from about 30° to 80° C.

10. The process as set forth in claim 7 wherein each said cooling pipe cleaning means includes a metal wire net vertically slidably mounted around and conforming to each cooling pipe to remove dust adhered to each cooling pipe.

11. An apparatus for separating and recovering the oil components from a flow of dust-including dry-distilled gases produced in a furnace for pyrolyzing solid polymer wastes, comprising a main housing, a bottom housing separated from the main housing and including a liquid-sealing structure for sealing the space between the bottom housing and the main housing, a baffle disposed within the main housing in a position along the flow of the dry-distilled gases, and plural groups of cooling pipes disposed within the main housing downstream of the baffle with each group of rigid cooling pipes having a cooling pipe cleaning means, each said cooling pipe cleaning means including a metal wire net mounted around and conforming to each group of cooling pipes to remove the dust adhered to the surface of the cooling pipes by vertically sliding on the surface thereof.

* * * * *